Jan. 11, 1949.                    W. M. CADY                     2,458,831
                    OPTICAL GUN SIGHT WITH HORIZONTAL AND
                        VERTICAL DEFLECTION ADJUSTMENTS
Filed July 9, 1945                                            2 Sheets—Sheet 1
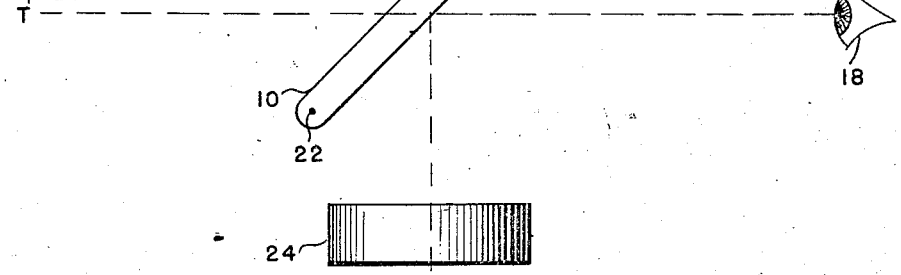
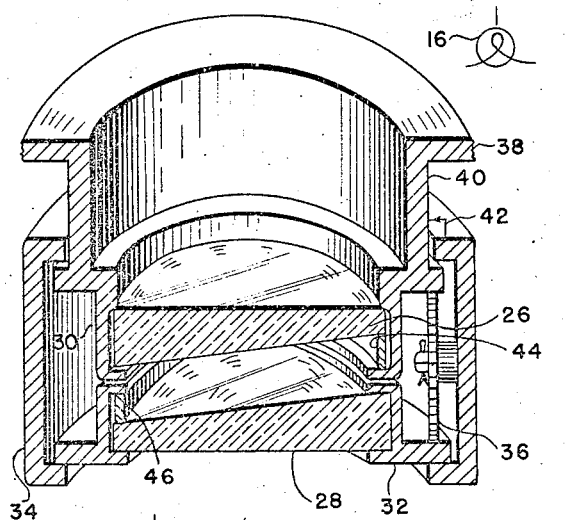
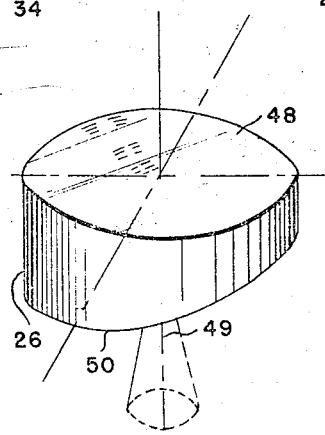
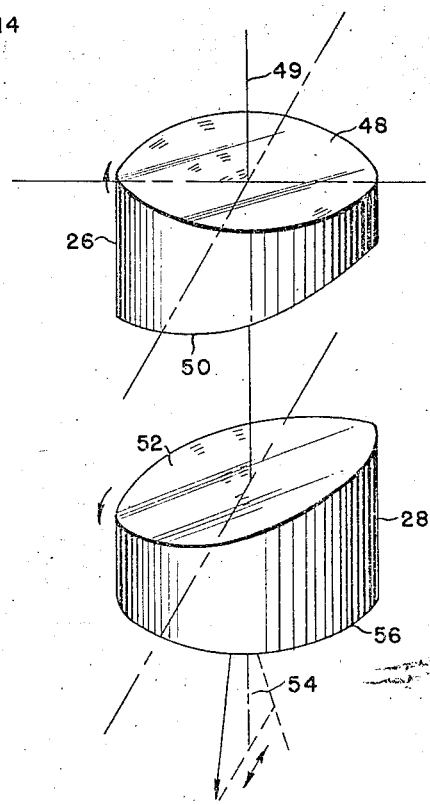
INVENTOR
WILLOUGHBY M. CADY
BY
William D. Hall
ATTORNEY

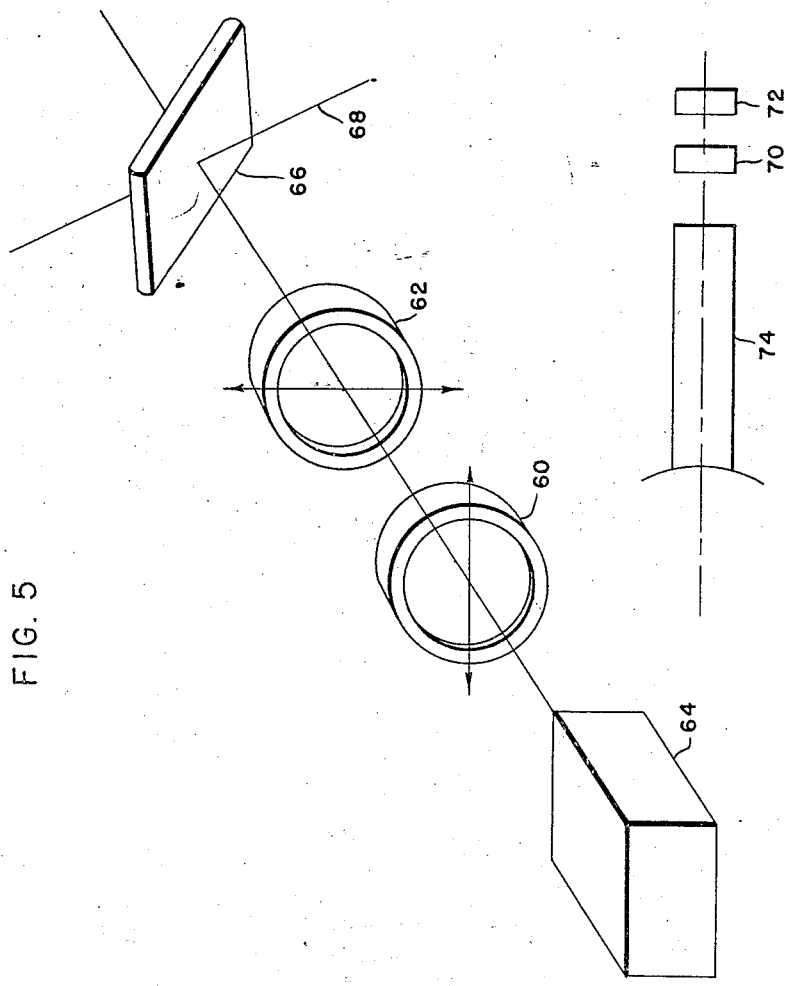

Patented Jan. 11, 1949

2,458,831

UNITED STATES PATENT OFFICE 2,458,831

OPTICAL GUN SIGHT WITH HORIZONTAL AND VERTICAL DEFLECTION ADJUSTMENTS

Willoughby M. Cady, Cambridge, Mass., assignor, by mesne assignments, to the United States of America as represented by the Secretary of War Application July 9, 1945, Serial No. 604,054

1 Claim. (Cl. 88—2.4)

This invention relates to precision aiming apparatus and more particularly to apparatus for improving the accuracy of optical sights on weapons and the like.

Optical sights have been developed for use on guns or rocket launchers that employ a movable reflector that is adjustable for the purpose of setting the correct elevation on the gun or rocket launcher. In many of these sights no provision is made for corrections at right angles to the path of the projectile to compensate for wind motion of the target and so forth. Such a correction is necessary where accurate fire must be directed at a target.

It is an object of the present invention, therefore, to improve existing reflector sights so that a correction may be made parallel to the pivotal axis of the reflector.

A further object of the invention is to provide simple, novel sight means which allow the introduction of corrections in both azimuth and elevation.

In accordance with the present invention there are provided means for viewing a target, means for superimposing a suitable reference image on the image of the target and means for adjusting the position of the reference image with respect to the target image.

For a better understanding of the invention together with other and further objects thereof, reference is had to the following description taken in connection with the accompanying drawings in which:

Fig. 1 is a schematic view showing the essential elements of a reflector sight embodying the present invention;

Fig. 2 is a sectional perspective view of the angular deflection unit of Fig. 1;

Fig. 3 is a schematic perspective view showing the effect of a glass wedge on a beam of light;

Fig. 4 is a schematic perspective view showing the effect of two coaxially placed glass wedges on a beam of light;

Fig. 5 is a diagrammatic perspective view illustrating how two units embodying the present invention may be employed to provide two corrections at right angles in a reflector type sight; and Fig. 6 shows how two units of the invention may be employed to provide two corrections at right angles with a telescopic sight.

Referring now more particularly to Fig. 1, there is shown an optical sight comprising a reflector 10, a lens 12, a screen 14 and a source of illumination 16. The position of observer's eye is at 18 and the position of the target is at point 20.

In the operation of this type of sight a set of cross-hairs or other aiming device is marked on screen 14. The light from source 16 causes an image of these cross-hairs to be thrown upon reflector 10. Reflector 10 is a piece of unsilvered glass with polished faces. Partial reflection occurs at the surface of reflector 10 so that at point 18 the observer sees target 20 with a set of cross-hairs superimposed upon it. When the center of the cross-hairs coincides with the selected target the sight is properly oriented. In many reflector sights reflector 10 is pivoted about an axis 22. When reflector 10 moves in the directions shown by the arrows in Fig. 1, the apparent position of the cross-hairs on the target 20 moves along a vertical line passing through the target. It can be seen that this adjustment could be used to make adjustments in elevation of the gun associated with this sight. These adjustments in elevation change the position at which the projectiles will fall along the line of flight of the projectiles. The angular deflection unit 24, Fig. 1, permits shifting the apparent position of the cross-hairs in a direction at right angles to the shift caused by adjustment of reflector 10.

Referring now to Fig. 2 there is shown a cross-sectional view of the angular deflection unit 24 of Fig. 1. Two circular refracting glass wedges 26 and 28 are held in position by retaining rings 30 and 32, respectively. A circular supporting ring 34 holds retaining rings 30 and 32 in position so that rings 30 and 32 may be rotated, but ring 34 is so constructed that rings 30 and 32 can have no lateral or axial movement relative to one another. An idler gear 36 is supported by a suitable projection on ring 34 and meshes with circular racks on rings 30 and 32. Ring 30 is provided with a knurled grip 38. A circular scale marked on the outer cylindrical surface 40 of ring 30 and a pointer 42 secured to ring 34 provide means for indicating the position of ring 30. The upper face of wedge 26 and the lower face of wedge 28 are maintained in planes perpendicular to the axis of ring 34. This may be done by suitable design of rings 30 and 32 or tapered crescents may be employed (as illustrated by crescents 44 and 46) to support the narrow portions of the glass wedges.

The operation of the deflection unit shown in Fig. 2 may be best understood by reference to Figs. 2, 3 and 4.

Wedge 26 shown in Fig. 3 is a cylindrical prism having a base 48 perpendicular to the axis 49 of the prism and a second base 50 at a slight angle to axis 49. If a beam of light parallel to the axis 49 strikes base 48 it will pass through wedge 26 emerging from base 50 at an angle with axis 49. The size of this angle is determined by the angle that base 50 makes with axis 49 and the material of which wedge 26 is made. If wedge 26 is now rotated about axis 49 the beam of light emerging from base 50 will describe a conical path in space as shown in Fig. 3.

Fig. 4 shows two identical wedges 26 and 28 intercepting a beam of light. The inclined base 52 of wedge 28 is placed uppermost. If axis 49 of wedge 26 is aligned with axis 54 of wedge 28 and wedges 26 and 28 are so oriented that base 50 is parallel to base 52 it can be shown that a beam of light parallel to axis 49 striking base 48 will emerge from base 56 parallel to axis 54. It can also be shown that if wedge 26 is rotated in one direction, say clockwise, while wedge 28 is rotated an equal amount in the opposite direction the beam of light emerging from base 56 will move back and forth in a plane perpendicular to base 56, as shown in Fig. 4. The angle that the beam of light makes with axis 54 depends upon the material from which the wedges are made, the angle the inclined base makes with the axis of each wedge and the angle of rotation of the wedges from their initial position.

Referring once more to Fig. 2 it can be seen that wedge 26 may be rotated manually by means of grip 38 while wedge 28 is moved in an equal and opposite direction by means of gear 36.

The amount of rotation of wedges 26 and 28 may be indicated by means of scale 40 and reference pointer 42. Scale 40 may be calibrated in any convenient manner as, for example, in degrees of displacement of the line of sight to the right or left of normal.

Referring now to Fig. 1, it can be seen that unit 24 may be so mounted that the apparent displacement of the cross-hairs caused by unit 24 is at right angles to the apparent displacement caused by reflector 10.

Referring now to Fig. 5 there is shown a reflector sight employing two angular correction units 60 and 62, a cross-hair unit 64 and a reflector 66. Units 60 and 62 are so oriented that the deflections of the beams caused by the two units are at right angles to each other. In this type of sight, reflector 66 may be fixed in position since all necessary displacements of the light beam may be obtained from units 60 and 62. In the sight shown in Fig. 5 the line of sight is represented by line 68.

If two angular correction units 70 and 72 are mounted coaxially with a telescopic sight 74, as indicated in Fig. 6, deflections of the line of sight in two directions may be obtained.

One of the chief advantages of this invention is that it may be adapted for attachment to existing sights. A second advantage is that by suitable selection of angles for the wedges and by careful construction of the supporting structure very accurate adjustments of the line of sight may be made.

While there has been described what is at present considered the preferred embodiment of the invention, it will be obvious to those skilled in the art that various changes and modifications may be made therein without departing from the invention.

What is claimed is:

In an optical gun sight for viewing a target, a reference reticle, a pivotable ray dividing means, means for projecting an image of said reticle upon said ray dividing means, a ray deflecting means optically interposed between said reference reticle and said ray dividing means, said ray deflecting means being adapted to change, in a horizontal direction, the position at which said image will strike said ray dividing means, said ray deflecting means including a pair of spaced coaxially disposed cylindrical optical prisms, said prisms having their bases, which are adjacent each other, disposed obliquely to their mutual axis and having their remaining bases disposed normally to their mutual axis, a circular rack secured to each of said prisms, said racks being coaxial with said prisms and of like diameter and facing each other, an idler gear in mesh with both of said racks and having the position of its axis of rotation fixed, means to revolve one of said prisms about its axis, means for pivoting the ray dividing means for changing, in a vertical direction, the position at which the image will strike said ray dividing means, whereby, upon revolving one of said prisms about its axis in one direction, the other prism is caused to revolve an equal amount in the opposite direction and thereby vary horizontally the position at which the image will strike the ray dividing means, and, upon pivoting of the ray dividing means, the position at which said image will strike said ray dividing means is varied vertically, the horizontal variations aforesaid being usable for windage correction and the vertical variation aforesaid being usable for range correction.

WILLOUGHBY M. CADY.

REFERENCES CITED

The following references are of record in the file of this patent:

UNITED STATES PATENTS

| Number | Name | Date |
| --- | --- | --- |
| 942,393 | König | Dec. 7, 1909 |
| 1,088,701 | Humbrecht | Mar. 3, 1914 |
| 1,093,639 | MacDougall | Apr. 21, 1914 |
| 2,394,521 | Lynn | Feb. 5, 1946 |

FOREIGN PATENTS

| Number | Country | Date |
| --- | --- | --- |
| 14,881 | Great Britain | 1912 |
| 428,759 | Great Britain | May 17, 1935 |